(12) United States Patent
Tsunetomo et al.

(10) Patent No.: US 11,892,154 B2
(45) Date of Patent: Feb. 6, 2024

(54) ILLUMINATION DEVICE

(71) Applicant: NIPPON SHEET GLASS COMPANY, LIMITED, Tokyo (JP)

(72) Inventors: Keiji Tsunetomo, Tokyo (JP); Satoru Kusaka, Tokyo (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 0 days.

(21) Appl. No.: 18/003,002

(22) PCT Filed: Jun. 14, 2021

(86) PCT No.: PCT/JP2021/022491
§ 371 (c)(1),
(2) Date: Dec. 22, 2022

(87) PCT Pub. No.: WO2022/009615
PCT Pub. Date: Jan. 13, 2022

(65) Prior Publication Data
US 2023/0258312 A1    Aug. 17, 2023

(30) Foreign Application Priority Data
Jul. 8, 2020 (JP) ................... 2020-117627

(51) Int. Cl.
*F21V 5/00* (2018.01)
*F21Y 115/10* (2016.01)

(52) U.S. Cl.
CPC ........... *F21V 5/007* (2013.01); *F21Y 2115/10* (2016.08)

(58) Field of Classification Search
CPC .............. G02B 27/095; G02B 27/0955; G02B 27/0966; G02B 5/02; G02B 5/0205; G03B 21/62; F21Y 2115/10; F21V 5/007
See application file for complete search history.

(56) References Cited

U.S. PATENT DOCUMENTS

| | | | |
|---|---|---|---|
| 5,499,262 A * | 3/1996 | Nakata | F21S 9/02 359/668 |
| 2008/0297020 A1 | 12/2008 | Wanninger et al. | |
| 2010/0165619 A1* | 7/2010 | Kawato | G02B 5/0278 362/331 |
| 2015/0377450 A1 | 12/2015 | Suh | |
| 2020/0018827 A1 | 1/2020 | Yamamoto | |

FOREIGN PATENT DOCUMENTS

| | | |
|---|---|---|
| JP | 2004184612 A | 7/2004 |
| JP | 2009510731 A | 3/2009 |
| JP | 2016510130 A | 4/2016 |
| JP | 2019220266 A | 12/2019 |
| WO | 2018146889 A1 | 8/2018 |

* cited by examiner

Primary Examiner — Thomas M Sember
(74) Attorney, Agent, or Firm — Lucas & Mercanti, LLP

(57) ABSTRACT

Provided is a illumination device having a sufficiently wide irradiation angle and a uniform light intensity within a predetermined range even when using a light source that emits light similar to light with a small spread angle, such as a laser, or to parallel light. This illumination device includes a light source including at least one light emitting portion; a first optical element that receives light output from the light source and outputs the light while expanding an output angle thereof and a second optical element that receives light output from the first optical element and outputs the light while further expanding an irradiation angle thereof.

8 Claims, 19 Drawing Sheets

(a)

(b)

(c)

ML

ML

SB

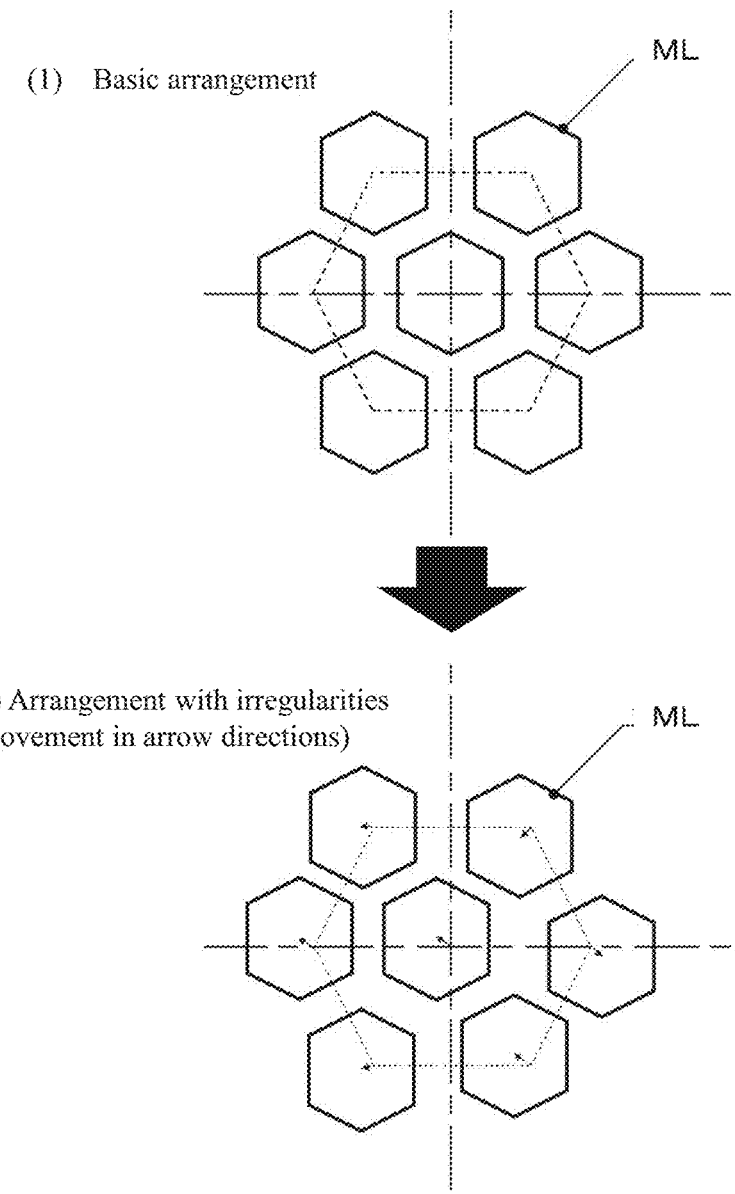

(1) Basic arrangement (2) Arrangement with irregularities
(movement in arrow directions)

| R | $6.09 \times 10^{-4}$ |
|---|---|
| K | -1.00001 |
| α2 | $-7.86029 \times 10^{-2}$ |
| α4 | $1.763011 \times 10^{3}$ |
| α6 | $1.575403 \times 10^{5}$ |

ILLUMINATION DEVICE

CROSS-REFERENCE TO RELATED APPLICATIONS

This application is a 371 of PCT/JP2021/022491, filed Jun. 14, 2021, which claims the benefit of Japanese Patent Application No. 2020-117627, filed Jul. 8, 2020.

TECHNICAL FIELD

The present invention relates to an illumination device.

BACKGROUND ART

Conventionally, known illumination devices, such as the devices described in Patent Literature 1 and Patent Literature 2, increase the angle of emission of light from a light source such as an LED and further obtain the uniformity of luminance (light intensity) in a given range. These conventional devices all include a light source such as an LED and a lens that adjusts the orientation of the light source, and are configured to refract the light emitted from the LED through the lens to expand the direction of light emission.

For such a lens, a type of meniscus lens is preferably used. This lens includes a first surface that receives light from the light source and a second surface that outputs light. The first surface is designed as a cavity to include an LED element therein. The lens has an axis (lens optical axis) and axial symmetry, and is substantially coaxial with the optical axis of the LED. On the second surface, a given area at the central portion including the lens optical axis is concave compared to the other area of the surface.

These techniques use a light source that inherently has a large emission angle, such as an LED, so as to expand its irradiation angle using the characteristics of the lens and the like. However, such illumination devices cannot easily be applied to a light source that inherently has a small light emission angle, such as a laser light source, and are hard to expand the light irradiation angle.

In addition, similar problems may occur when the illumination device uses a light source other than the laser light source, for example, a collimated light source that outputs parallel light having a small beam diameter through a collimating lens. Specifically, since the light emitted from the collimated light source includes only the light components parallel to the optical axis, the illumination device is hard to obtain a sufficiently large irradiation angle for the output light.

CITATION LIST

Patent Literature

Patent Literature 1: JP 2019-220266 A
Patent Literature 2: JP 2009-510731 A

SUMMARY OF INVENTION

Technical Problem

The present invention has been made in view of the foregoing, and aims to provide an illumination device having a sufficiently wide irradiation angle and a uniform light intensity within a predetermined range even when using a light source that emits light similar to light with a small spread angle, such as a laser, or to parallel light.

Solution to Problem

In response to the above issue, an illumination device according to the present invention includes a light source including at least one light emitting portion, a first optical element configured to receive light output from the light source and output the light while expanding an output angle thereof, and a second optical element configured to receive light output from the first optical element and output the light while further expanding an irradiation angle thereof.

Advantageous Effects of Invention

According to the present invention, it is possible to provide an illumination device having a sufficiently wide irradiation angle and a uniform light intensity within a predetermined range even when using a light source that emits light similar to light with a small spread angle, such as a laser, or to parallel light.

BRIEF DESCRIPTION OF DRAWINGS

FIG. 11C is a top view of an example of a microlens array in which microlenses are arranged with irregularities.

DESCRIPTION OF EMBODIMENTS

In the following, the present embodiment will be described with reference to the attached drawings. In the attached drawings, functionally identical elements may be designated with identical numerals. The attached drawings illustrate an embodiment and implementation examples in accordance with the principles of the present disclosure. However, these are provided to assist an understanding of the present disclosure and should not be construed as limiting the present disclosure. The descriptions that follow are for exemplary purposes only, and do not in any way represent a limitation of the scope of the claims or application examples of the present disclosure.

While the present embodiment is described in sufficient detail to enable a person skilled in the art to practice the present disclosure, it will be understood that other implementations or embodiments are also possible, and that various changes to configurations or structures and various substitutions of elements may be made without departing from the scope and spirit of the technical concepts of the present disclosure. Accordingly, the following descriptions are not to be interpreted in a limiting sense.

Figure 1A:
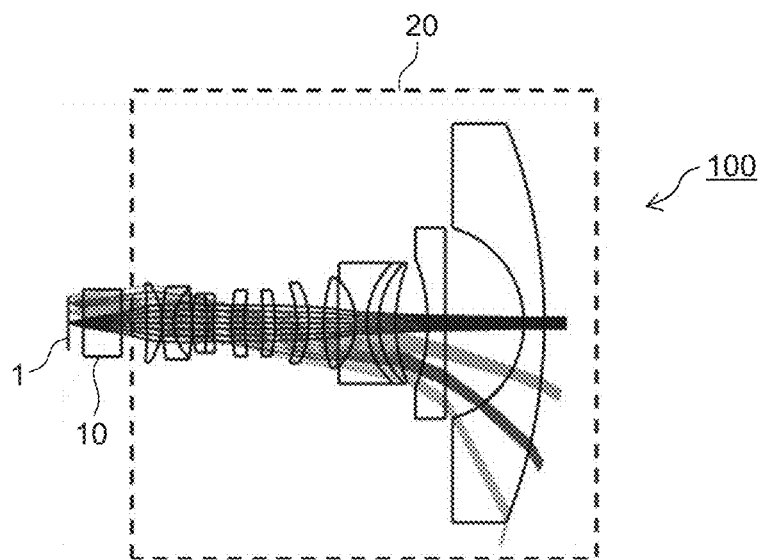
FIG. 1A is an optical configuration diagram of the entire configuration of an illumination device 100 according to one embodiment.
Figure 1B:
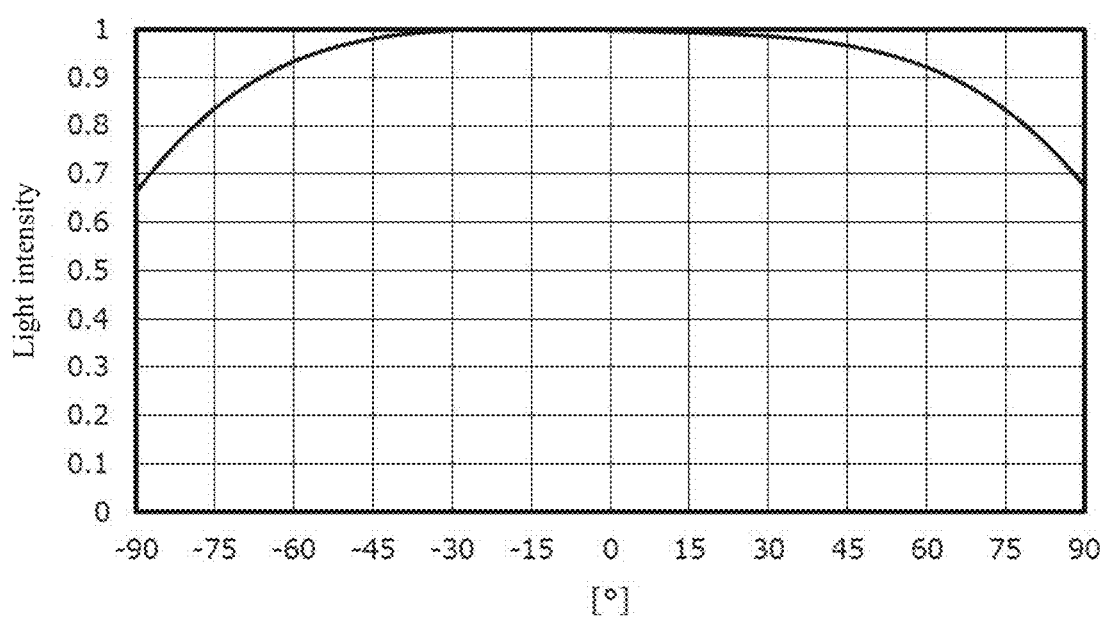
FIG. 1B is a graph showing the light intensity characteristics of light output from the illumination device 100.

Referring to FIG. 1A and FIG. 1B, an illumination device according to one embodiment will be described. FIG. 1A is an optical configuration diagram of the entire configuration of the illumination device according to one embodiment. FIG. 1B is a graph showing the light intensity characteristics of this illumination device. As shown in FIG. 1A, the illumination device 100 roughly includes a light source 1, a first optical element 10, and a second optical element 20.

The light source 1 is a light source that emits light with high directivity, such as laser light. Instead of the laser light source, the light source 1 may be a combination of a light source that emits light with relatively low directivity such as an LED, and a collimating lens that converts the emitted light into parallel light.

The first optical element 10 has a role of expanding the angle of irradiation of the light output from the light source 1. The second optical element 20 has a role of further expanding the angle of irradiation of the light that has been expanded and output by the first optical element 10.

FIG. 1B shows an example of a light intensity distribution of this illumination device 100. In FIG. 1B, the horizontal axis represents an angle with respect to the optical axis, and the vertical axis represents a light intensity with the maximum intensity set to 1.

The light output angle is synonymous with a divergence angle, or a spread angle, of light from devices, such as an optical device or an illumination device. The magnitude of the output angle is closely related to the size of the illumination range of the illumination device. In this specification, when measuring or calculating by simulation the light intensity distribution (light intensity distribution characteristics) from devices, such as an optical device or an illumination device, a light intensity per unit solid angle is relatively determined according to the light output angle (the value of the maximum light intensity is 1).

As shown in FIG. 1B, in the light intensity distribution characteristics of the illumination device 100 according to the present embodiment, when the output light has an output angle of ±90°, the light intensity is 0.5 or larger, preferably 0.55 or larger, more preferably 0.6 or larger. When the light intensity is 0.9 or larger, the absolute value of the output angle is 45° or smaller (−45° to 45°), preferably 50° or smaller, more preferably 55° or smaller, particularly preferably 60° or smaller. It should be noted that the light intensity distribution may be measured using, for example, a light distribution measuring device IMS-5000 available from Asahi Spectra Co., Ltd.

For the light source 1, a laser light source having a relatively small irradiation angle (spread angle) is suitable for making full use of the function of the illumination device 100 of the present embodiment. When the light source 1 is a laser light source, the laser light source may be a light emitting array including a plurality of light emitting portions in a predetermined area or a single laser element including only one light emitting portion.

When the light source 1 is a laser light source, the laser light source may be a Vertical Cavity Surface Emitting LASER (VCSEL) or a VCSEL array in which substantial light emitting portions are arranged two or three-dimensionally. For the light source 1, other than the laser light source, an LED element or an LED array in which substantial light emitting portions are arranged two or three-dimensionally may be used. Additionally, other than the laser light source and the electroluminescent light source such as the LED, a thermal radiation light source, a luminescent light source based on electric discharge, and the like may be used. Examples of the thermal radiation light source include an incandescent lamp and a halogen lamp. Typical examples of the luminescent light source based on electric discharge include a high-pressure mercury-vapor lamp, a metal halide lamp, and a fluorescent lamp. As for the angle of irradiation of the light from the light source 1 used, in the light intensity distribution of the light source, a full width at half maximum (FWHM) is 6° to 40°, preferably 12° to 30°, more preferably 15° to 24°.

The first optical element 10 includes a first surface to which light is incident, and a second surface from which light is output. The first optical element 10 may be, for example, a surface having a light diffusion function and a homogenizing effect or may include a homogenizer and a diffusion plate or a diffusion element (diffusion function).

The diffusion plate or the diffusion element has a surface or inner structure, such as fine concave and convex portions, for refraction or diffraction, so as to have a function of diffusing incident light at a constant angle. The second surface may also be a surface having a diffusion function like the first surface or may be a surface without a diffusion function. However, the first optical element 10 need be an element having a diffusion function on at least one of the first surface or the second surface.

The first optical element 10 may be, for example, a microlens array, a cylindrical lens array, a microprism array, a Fresnel lens array, or the like. These arrays may respectively include a plurality of microlenses, cylindrical lenses, microprisms, and Fresnel lenses on at least one of the first surface or the second surface of the first optical element 10 to form an optical element. It should be noted that one first optical element 10 may include a plurality of types of optical elements.

In addition, the microlens and the microprism may have a concave shape or a convex shape. The microlenses and the microprisms may be arranged regularly or distributed randomly. The microlenses and the microprisms may include those having different curvatures, shapes, angles, and sizes.

In addition, the first optical element 10 may be, for example, a frost type diffusion plate with fine concave and convex portions formed on the surface of a substrate or a support by rough cutting. It should be noted that the first optical element 10 may have, but is not limited to, an axisymmetric or point symmetric structure with respect to the center. When the first optical element 10 includes a plurality of structures, such as a plurality of lenses, the first optical element 10 may have an asymmetrical structure.

FIG. 2(a) to (c) shows an example of the configuration of the microlens array 10M that is used as the first optical element 10. The microlens array 10M includes a substrate SB provided with a first surface S1 to which light is incident and on which a plurality of microlenses ML are arranged and a second surface S2 from which light is output. The second surface S2 is planar. This causes the microlens array 10M to be an element having a substantially flat shape. It should be noted that in FIG. 2(a) to (c), the microlenses ML may be formed on both of the first surface S1 and the second surface S2. In this case, two surfaces in total have a function of acting on light, and thus the effect of expanding the irradiation angle may be increased.

Though not shown, the microlens array 10M may have a shape including a concave shape and/or convex shape, other than the substantially flat shape as shown in FIG. 2(a) to (c). The material of the microlens array 10M is not particularly limited. The material of the microlens array 10M includes resin or glass, and may be inorganic material or organic material, or further inorganic-organic hybrid material.

Also the method for manufacturing the microlens array 10M is not particularly limited. For example, the method may prepare in advance a transfer mold, and then form the microlens array 10M by molding. In particular, when a surface or a member and/or a support including the surface is formed from resin or plastic, examples of the molding method may include injection molding, blow molding, extrusion molding, casting, vacuum forming, and the like.

In addition, the method may flow fluid resin or uncured resin onto a substrate or a support made from material such as glass or resin, transfer microlenses onto at least one side of the resin using a mold, thereafter allow the resin to dry or cure, and integrate the resin with the substrate or the support, thereby forming the microlens array 10M (2P molding: two-piece molding).

The cylindrical lens array, the microprism lens array, and the like may also be formed by the same method.

Figure 3A:
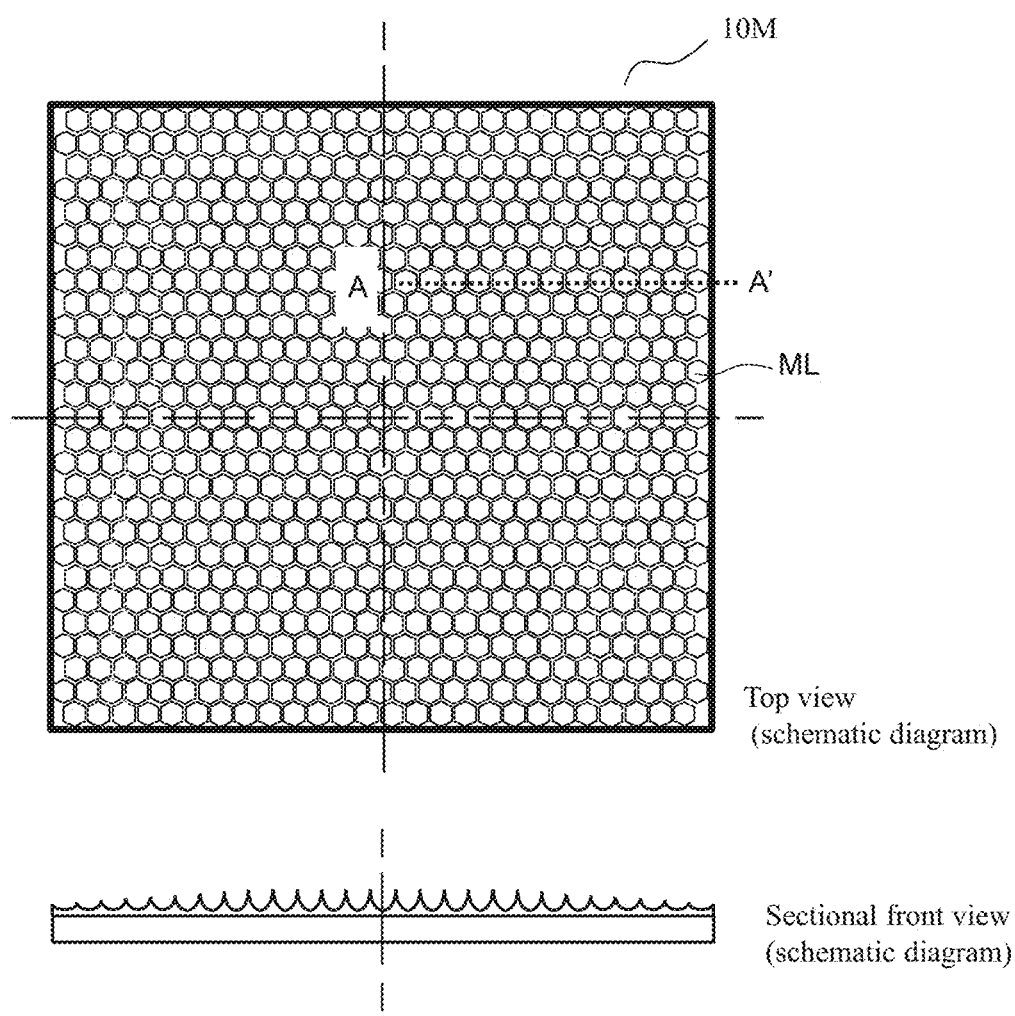
FIG. 3A is an example of the top view of the microlens array 10M.

Furthermore, as the first optical element 10, the microlens array 10M may include a distribution in the shapes of individual microlenses. FIG. 3A shows a top view of such a microlens array 10M.

Figure 2:
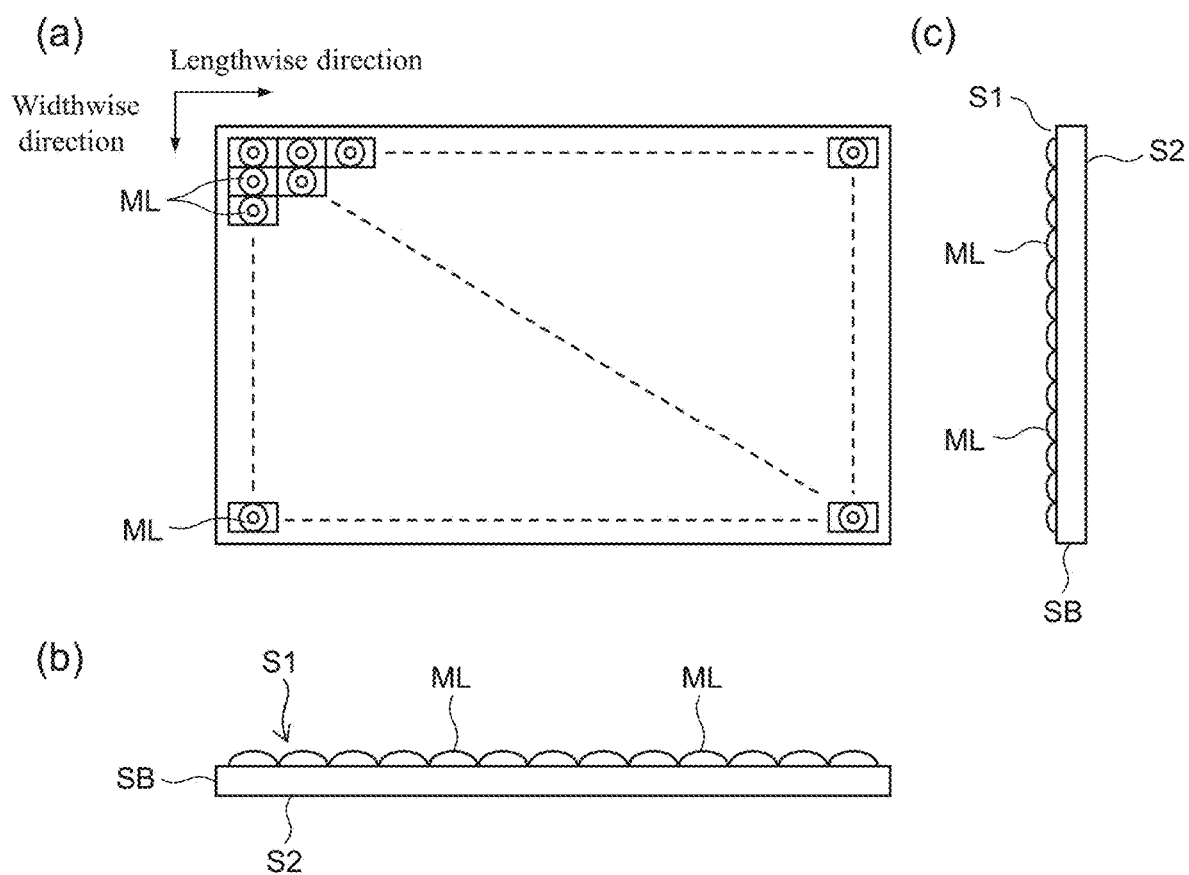
FIG. 2 is a schematic diagram of an exemplary configuration of a microlens array 10M that is used as a first optical element 10.

The microlens array 10M shown in FIG. 3A has an approximately square shape of about 1 mm×1 mm in plan view, for example. The size of the microlens array 10M may be varied depending on the size of the light source 1, the intended illumination performance of the illumination device, and the like. Each microlens ML may have an approximately square shape as shown in FIG. 2, a polygonal shape as shown in FIG. 3A, or a circular or elliptic shape.

In the plan view of FIG. 3A, the outer shape of each microlens ML in the microlens array 10M shows a circle or a polygon, such as a hexagon, about the symmetry axis, and the lens diameter may be about 25 µm or smaller, for example. It should be noted that when the outer shape of the microlens ML is a circle, the diameter of the circle is equal to the lens diameter. When the outer shape of the microlens ML is a polygon, the diameter of its circumcircle is equal to the lens diameter.

In the microlens array 10M of FIG. 3A, six microlenses are arranged with equal pitches and equal phases with respect to one microlens (in the specification, such an arrangement is called "hexagonally packing arrangement"; the same applies hereinafter). The lens pitch (i.e., the distance between the centers of two adjacent lenses) is about 25 µm, for example.

Figure 3B:
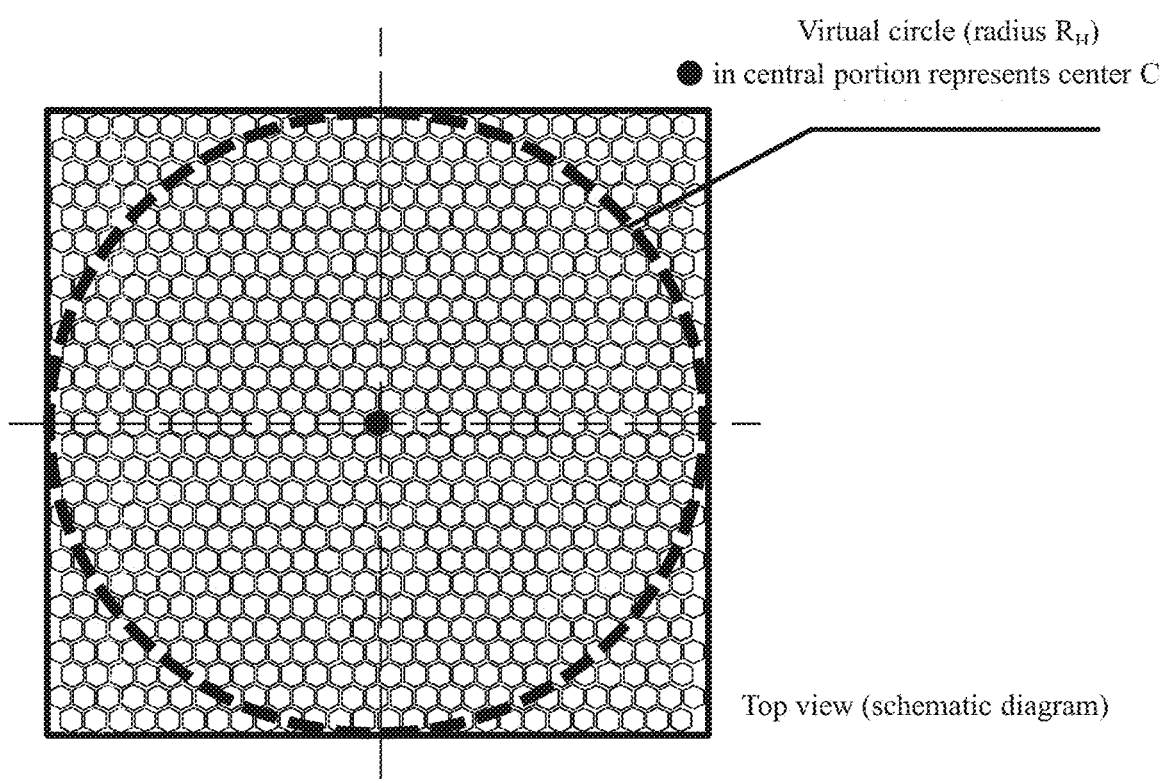
FIG. 3B is a schematic diagram for explaining a virtual circle.

To specify the microlens array 10M, as shown in FIG. 3B, a virtual circle having a center C and a radius $R_H$ may be assumed for the top face of the microlens array 10M. The center position and the radius of the virtual circle may be determined based on the relationship among, for example, the shape and size of the microlens array 10M, the size of the light source 1, and the output angle of light output from the light source 1 and the like. That is, the position and the size of the virtual circle may be determined based on the size corresponding to the effective range through which the output light transmits.

When the microlens array 10M shows a circular shape in plan view, the circular shape itself may be set as the virtual circle. When the microlens array 10M shows an elliptic shape, a polygonal shape, or another shape formed with curved lines or straight lines in plan view, an incircle tangent to the contour of the shape in plan view may be set as the virtual circle. In addition, when the microlens array 10M shows a polygonal shape in plan view, a circle contained in the polygon or an incircle tangent to one of the sides of the polygon may be set as the virtual circle.

Now the properties of the microlenses ML included in the microlens array 10M will be described. In one example, as shown in FIG. 3A, assume that the contour of the microlens array 10M has a square shape of 1 mm×1 mm in plan view, and the axisymmetric microlenses ML are arranged in a hexagonal packing. The virtual circle is an incircle of the contour of the microlens array 10M in plan view.

The geometrical center of the microlens array 10M or the symmetry axis of the microlens in vicinity of the geometrical center may be set as the center C of the virtual circle. In the example of FIG. 3A, the radius $R_H$ of the virtual circle is 500 µm. The example of FIG. 3A is one example for facilitating an understanding and should not be construed as limiting the present invention.

Figure 4:
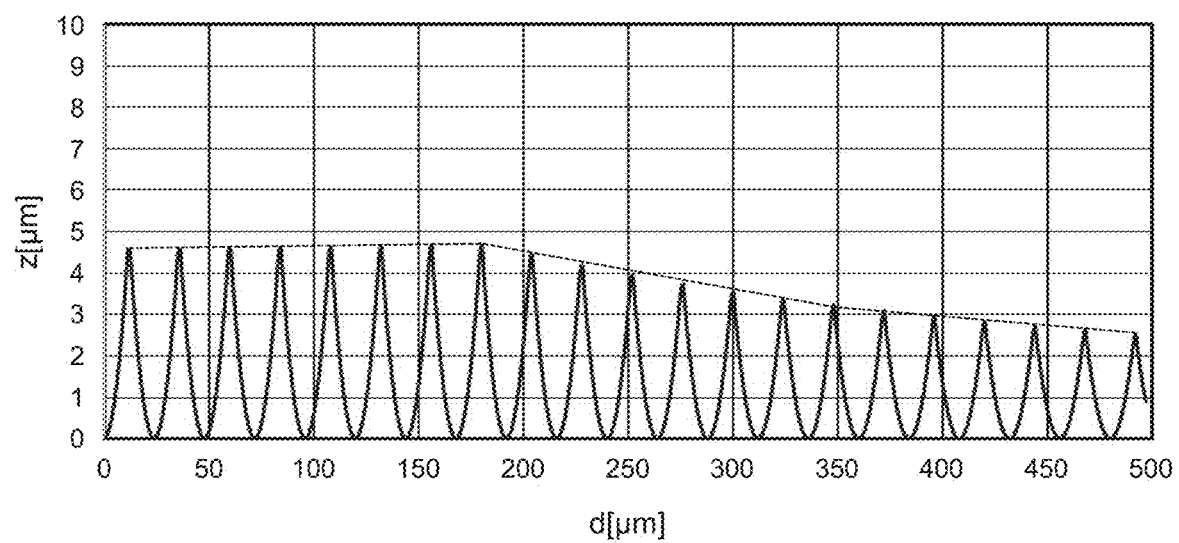
FIG. 4 is a graph, where the horizontal axis represents a distance d (d=0 to $R_H$) from the center C of the virtual circle to the center of the top surface (lens surface) of each microlens ML and the vertical axis represents a sag z of the microlens ML.

The shapes of the microlenses ML may vary according to the distance d from the center C of the virtual circle. FIG. 4 is a graph, where the horizontal axis represents a distance d (d=0 to $R_H$) from the center C of the virtual circle and the vertical axis represents a sag z of the microlens ML. FIG. 4 shows the shape of a part of the cross section of the microlenses ML aligned along dashed line A-A' of FIG. 3A. In the example shown in FIG. 4, the each microlens ML has a concave lens, but should not be limited thereto.

As can be seen from the graph of FIG. 4, in this example, the shapes of the microlenses ML vary depending on the position (distance d) on the microlens array 10M, specifically the microlenses ML are provided such that (for at least a part of the microlenses ML) the larger the distance d, the smaller the sag z. The sag or the amount of sag refers to a maximum depth (or a maximum height when the microlens is convex) in the direction parallel to the symmetry axis or the optical axis of the microlens ML. One further feature of the example of FIG. 4 is that the angle of the tangent plane of the microlens ML (the dashed line of FIG. 4) varies according to the distance d. Such variations are provided because the inclination angle of the tangent plane allows evaluating, when light enters the microlens ML, at what divergence angle or diffusion angle with respect to the symmetry axis of the microlens ML the light will emerge from the microlens ML.

Figure 5:
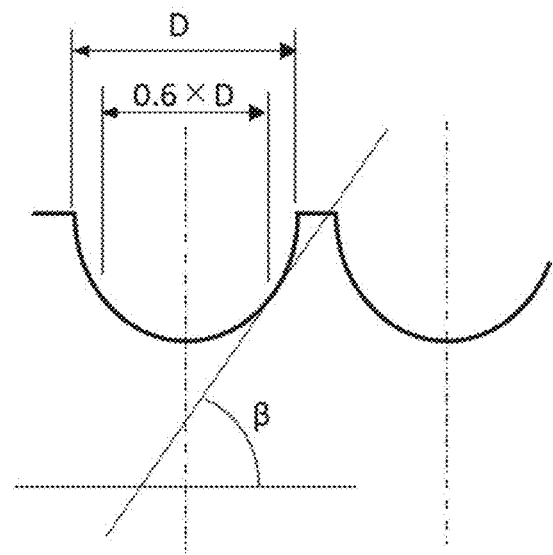
FIG. 5 is a cross-sectional view of the microlens ML when cut along the plane including a symmetry axis.
Figure 6:
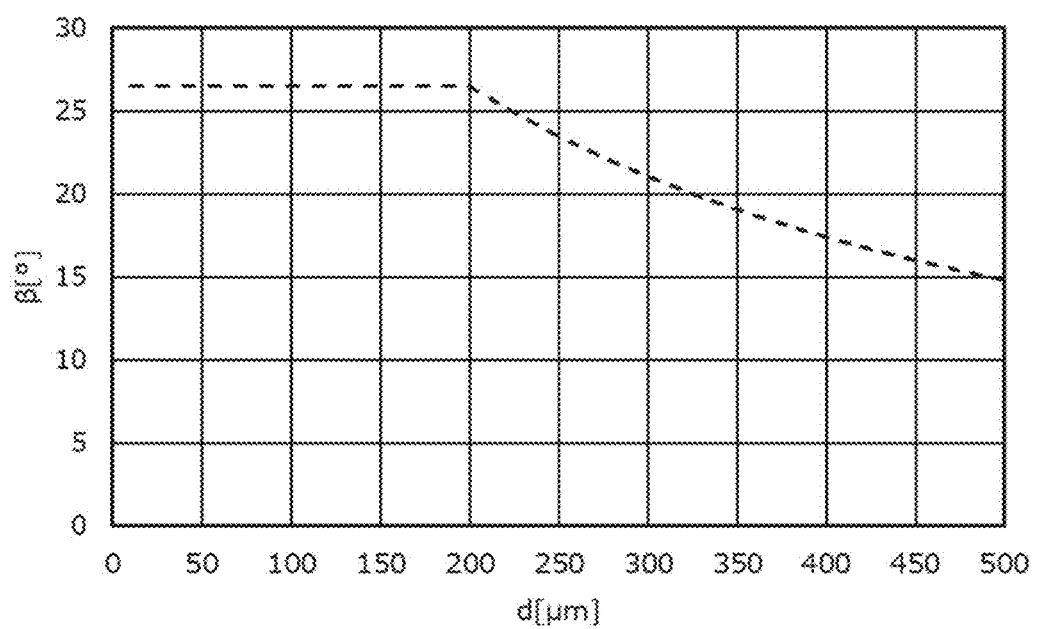
FIG. 6 is a graph showing the relationship between a distance d and a specific inclination angle β for the example of the microlenses shown in FIG. 4.

FIG. 5 is a cross-sectional view of the microlens ML when cut along the plane including the symmetry axis. When the diameter of the microlens ML is denoted by D, the inclination angle of the tangent plane on the lens surface at a predetermined position (for example, a position away from the center by distance 0.6×D) between the center and the edge of the microlens ML is represented by a specific inclination angle β. This specific inclination angle β is one of indexes representing the feature of the shape of the microlens ML. The graph of FIG. 6 shows the relationship between a distance d and a specific inclination angle β for the example of the microlenses shown in FIG. 4. Since the microlenses ML are formed in a discrete manner in the microlens array 10M, the specific inclination angle β is also discrete with respect to the distance d, and the coordinates (d, β) are any one of the points on the dashed line shown in FIG. 6.

In the example of FIG. 6, the specific inclination angle β is constant within the range of d=0 to $d_1$ ($d_1 < R_H$), and monotonically decreases according to an increase in d within the range of $d=d_1$ to $R_H$, where $d_1=0.6 \times R_H$, preferably $d_1=0.5 \times R_H$, more preferably $d_1=0.45 \times R_H$. The maximum value $\beta_{max}$ of the specific inclination angle β of the microlens ML within the range of d=0 to $R_H$ is 20° to 40°, preferably 22° to 35°, more preferably 25° to 32°, particularly preferably 25° to 30°. Furthermore, the minimum value $\beta_{min}$ of the specific inclination angle β of the microlens ML within the range of d=0 to $R_H$ is 5° to 25°, preferably 10° to 20°, more preferably 12° to 18°. Furthermore, the value of $\beta_{min}/\beta_{max}$ is 0.2 to 1.0, preferably 0.4 to 0.8, more preferably 0.5 to 0.7. In short, in the region away from a predetermined position by the distance d of a predetermined value or smaller, the plurality of microlenses ML have approximately the same shape, and in the region away from the predetermined position by the distance d exceeding the predetermined value, the shapes of the microlenses ML vary according to the distance d. The specific inclination angle β may be measured using the industrial microscope OLS4500 (objective lens with a magnification of 100×) having the function of a scanning laser microscope, available from OLYMPUS CORPORATION.

In one example, the shape of each microlens ML is an axisymmetric aspherical shape given by the following Equation 1:

$$z = \frac{\frac{r^2}{R \cdot k}}{1 + \sqrt{1 - (1+K) \cdot \frac{r^2}{(R \cdot k)^2}}} + \frac{\alpha 2}{k} \cdot r^2 + \frac{\alpha 4}{k^3} \cdot r^4 + \frac{\alpha 6}{k^5} \cdot r^6 \qquad \text{[Equation 1]}$$

Where, z is a sag, r is a distance from the symmetry axis, K is an aspherical coefficient, R is a radius (paraxial radius) when the surface close to the symmetry axis approximates a spherical surface, α2, α4, α6 are high order coefficients, and k is a coefficient for adjusting the specific inclination angle β of the microlens ML (i.e., the specific inclination angle adjustment coefficient).

Figure 7:
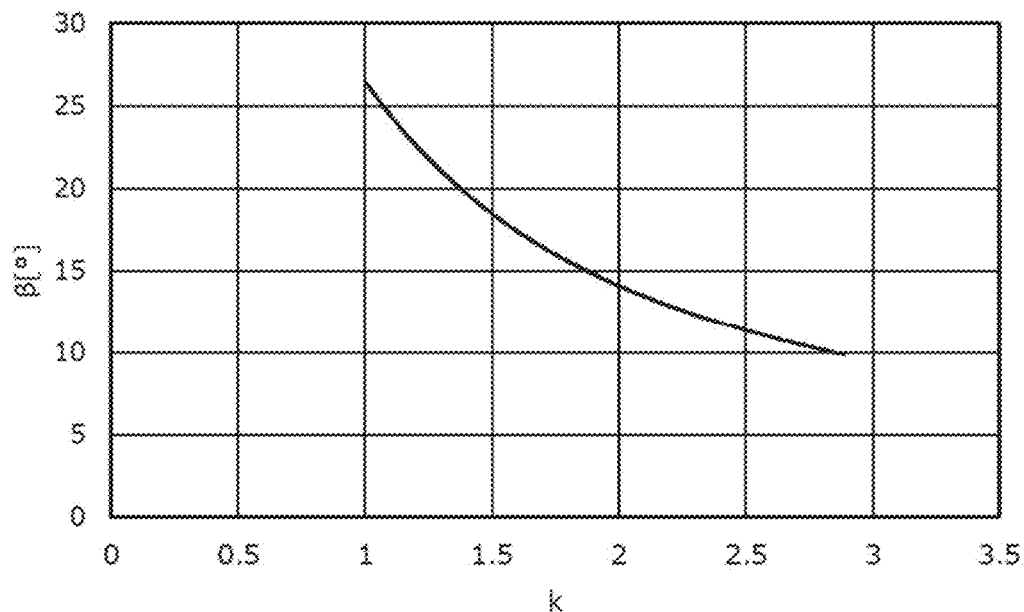
FIG. 7 is a graph showing an example of the relationship between a specific inclination angle adjustment coefficient k and a specific inclination angle β.

For each microlens ML, the shape of the microlens ML may be adjusted by adjusting the coefficient k that is commonly included in the terms of the orders. Even when the coefficient k varies to have a different value, the shapes of the lenses are analogous as long as they follow Equation 1. Creating the microlenses ML in analogous shapes with different values of the coefficient k is advantageous in terms of costs also when producing the microlens array 10M using a transfer mold. By setting the shape of the axisymmetric microlens ML in accordance with Equation 1, the microlens ML having an intended specific inclination angle β can be expressed by simply changing the value of the specific inclination angle adjustment coefficient k. This is reasonable also when producing a transfer mold and the like. One example of the relationship between the specific inclination angle adjustment coefficient k and the specific inclination angle β is shown by the graph of FIG. 7, for example, with use of a predetermined coefficient.

Figure 8:
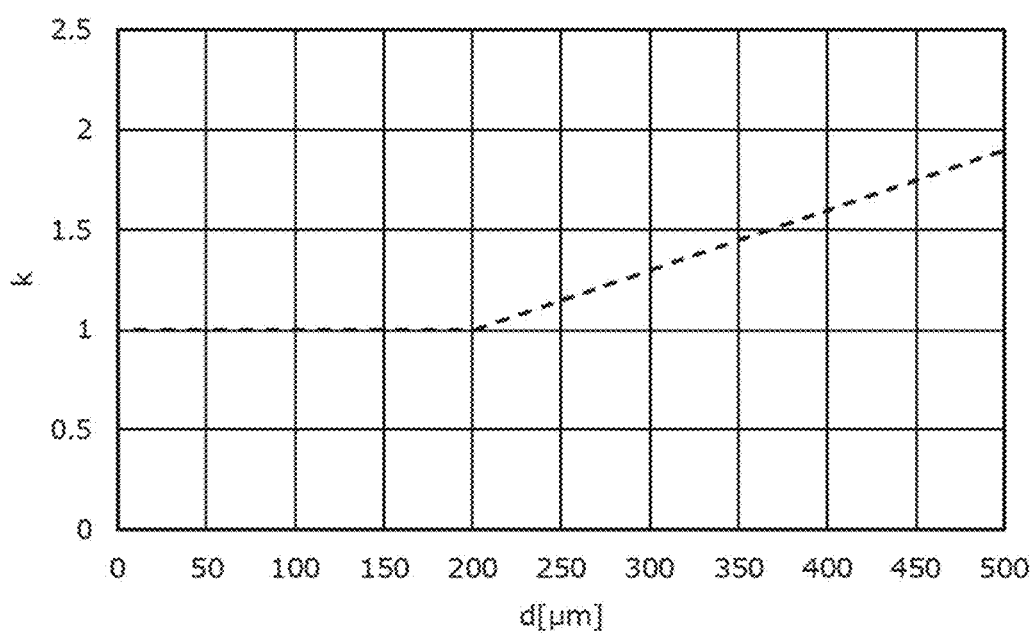
FIG. 8 is a graph showing an example of the relationship between a distance d and a specific inclination angle adjustment coefficient k of the microlenses ML of FIG. 4 and FIG. 6.

FIG. 8 shows an example of the relationship between the distance d and the specific inclination angle adjustment coefficient k of the microlenses ML of FIG. 4 and FIG. 6. The specific inclination angle adjustment coefficient k of the microlens ML is constant within the range of d=0 to $d_1$ ($d_1 < R_H$), and monotonically increases within the range of $d=d_1$ to $R_H$, where $d_1=0.6 \times R_H$, preferably $d_1=0.5 \times R_H$, more preferably $d_1=0.45 \times R_H$.

When the specific inclination angle adjustment coefficient k is 1 in the above range in which the specific inclination angle adjustment coefficient k is constant, the maximum value $k_{max}$ of the specific inclination angle adjustment coefficient k of the microlens ML within the range of d=0 to $R_H$ is 1.2 to 2.7, preferably 1.5 to 2.5, particularly preferably 1.7 to 2.2.

Figure 9:
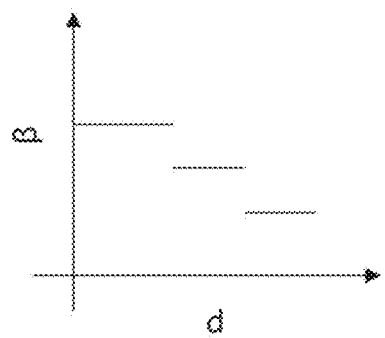
FIG. 9 is a graph showing an example of the relationship between a specific inclination angle β of the microlens ML and a distance d from the center C.
Figure 9:
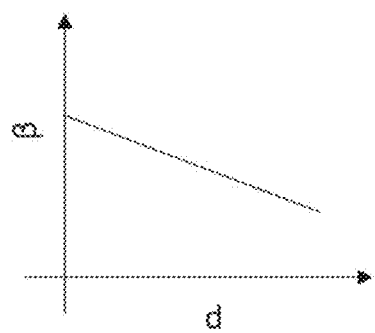
Figure 9:
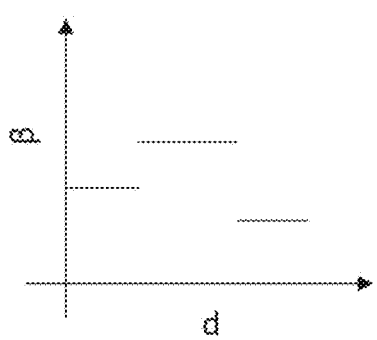

In addition, the specific inclination angle β of the microlens ML may include a distribution as shown in FIG. 9(a) to (c) with respect to the distance d from the center C.

Figure 10A:
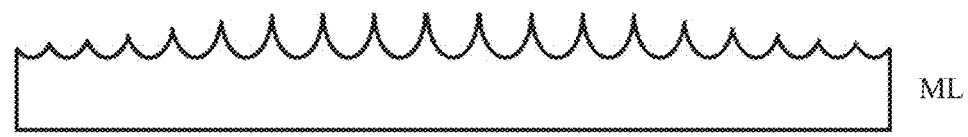
FIG. 10A shows an example of the configuration of the first optical element 10.
Figure 10B:
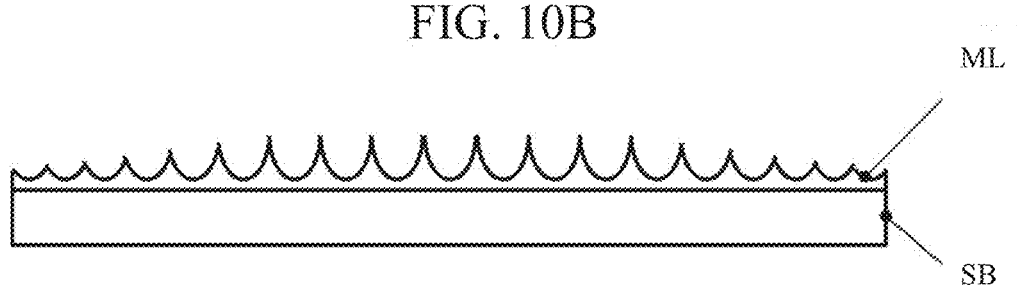
FIG. 10B shows an example of the configuration of the first optical element 10.
Figure 10C:
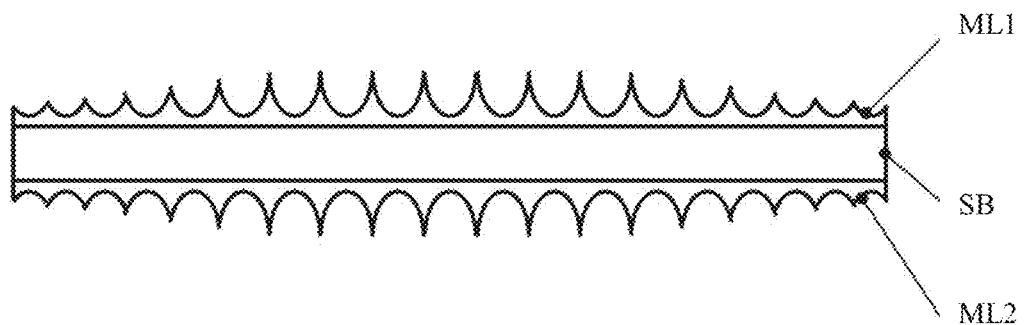
FIG. 10C shows an example of the configuration of the first optical element 10.

Referring to FIGS. 10A to 10G, specific examples of the configuration of the first optical element 10 will be described. In the configuration example of FIG. 10A, concave microlenses ML are formed on only one side of the resin material of the microlenses ML, and a substrate is omitted. In the configuration example of FIG. 10B, resin material of the concave microlenses ML is formed only on the first surface S1 side of the substrate SB. In the example of FIG. 10C, concave microlenses ML1, ML2 are formed on the first surface S1 side and the second surface S2 side of the substrate SB, respectively.

Figure 10D:
FIG. 10D shows an example of the configuration of the first optical element 10.
Figure 10E:
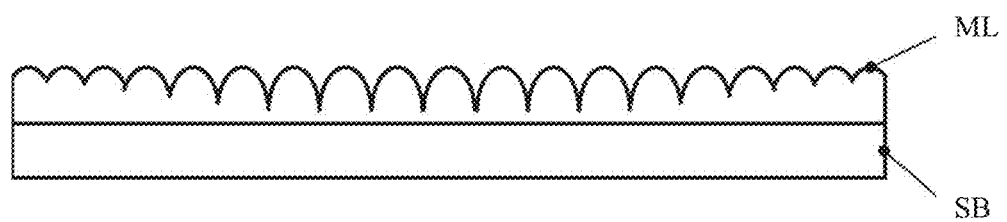
FIG. 10E shows an example of the configuration of the first optical element 10.
Figure 10F:
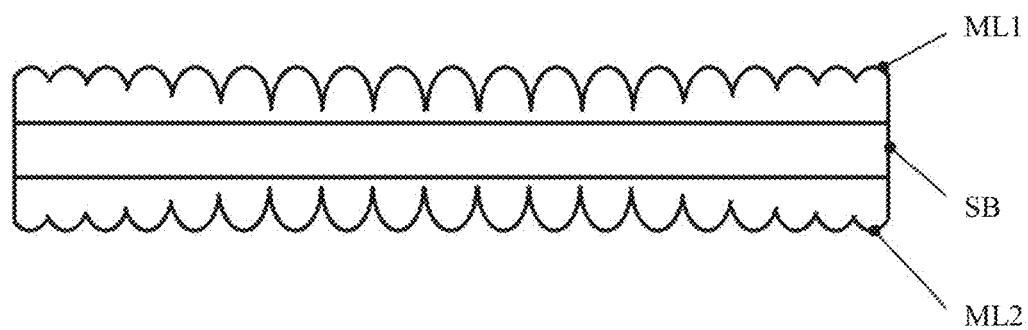
FIG. 10F shows an example of the configuration of the first optical element 10.
Figure 10G:
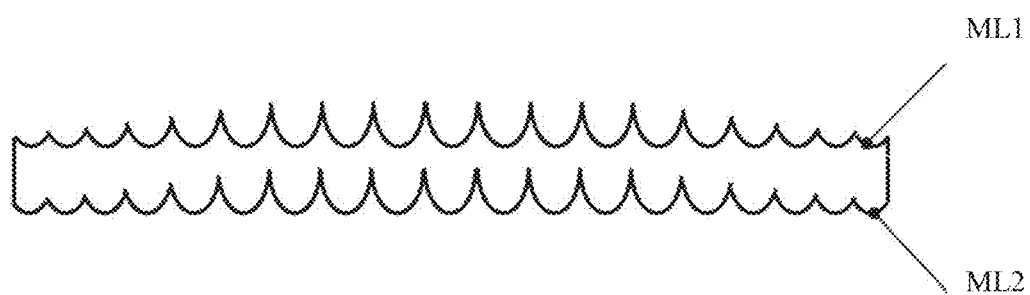
FIG. 10G shows an example of the configuration of the first optical element 10.

In the configuration example of FIG. 10D, convex microlenses ML are formed only on one side of the resin material of the microlenses ML, and a substrate is omitted. In the configuration example of FIG. 10E, resin material of the convex microlenses ML is formed only on the first surface S1 side of the substrate SB. In the example of FIG. 10F, convex microlenses ML1, ML2 are formed on the first surface S1 side and the second surface S2 side of the substrate SB, respectively. In the example of FIG. 10G, the concave microlenses ML1 are formed on one side of the resin material, and the convex microlenses ML2 are formed on the other side of the resin material (a substrate is omitted).

Figure 11A:
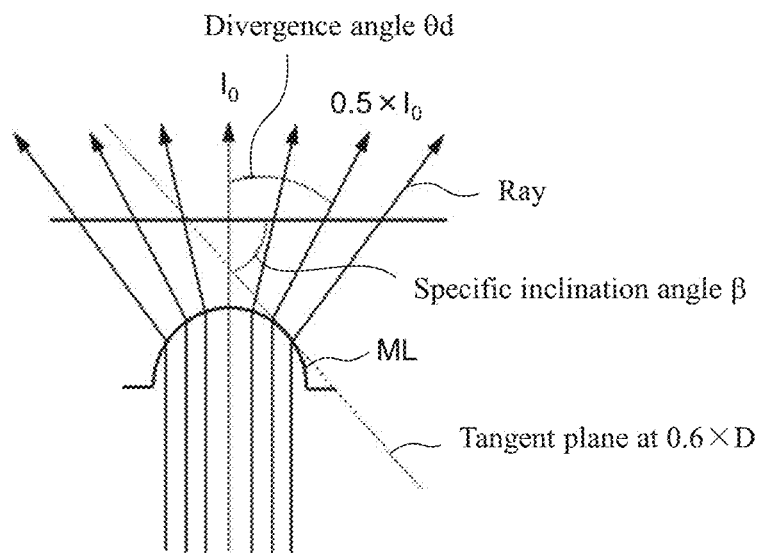
FIG. 11A is a schematic diagram for explaining the definition of a divergence angle θd.

It should be noted that as described above, the specific inclination angle β of the microlens ML corresponds to a divergence angle θd when light enters and emerges from the microlens ML. The divergence angle θd of the emerging light from incident parallel light through the microlens ML is defined as the output angle corresponding to a half value of the maximum light intensity when the light intensity per unit solid angle is measured or calculated according to the output angle (see FIG. 11A).

The divergence angle θd is measured with reference to the symmetry axis of the microlens ML. The specific inclination angle β of the microlens ML is measured with reference to the plane perpendicular to the symmetry axis of the microlens ML. When the microlenses ML are formed on one of the two parallel principal planes of the flat substrate, the angle defined between the principal plane and the tangent plane may be set as a specific inclination angle.

Figure 11B:
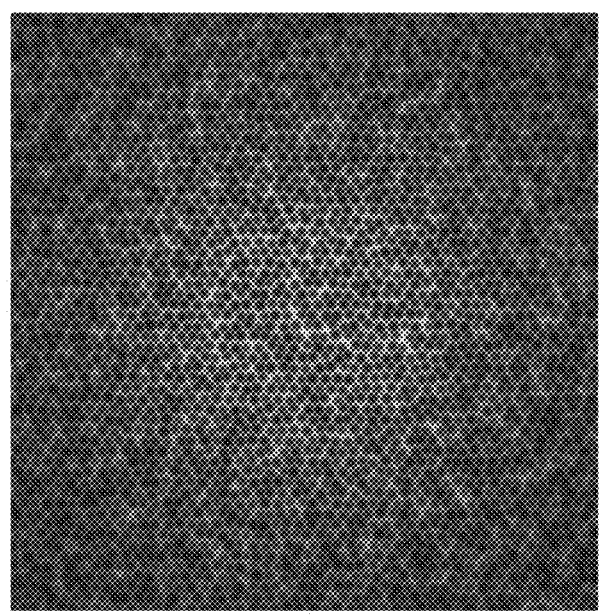
FIG. 11B is a top view of an example of a microlens array in which microlenses are arranged with irregularities.
Figure 11D:
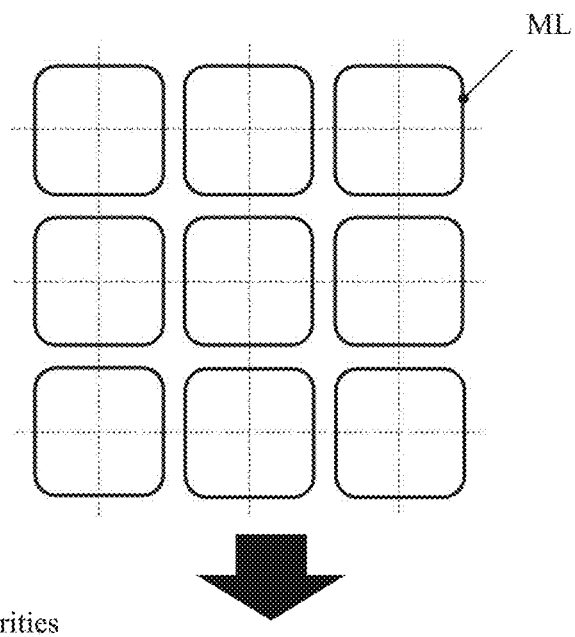
FIG. 11D is a top view of an example of a microlens array in which microlenses are arranged with irregularities.
Figure 11D:
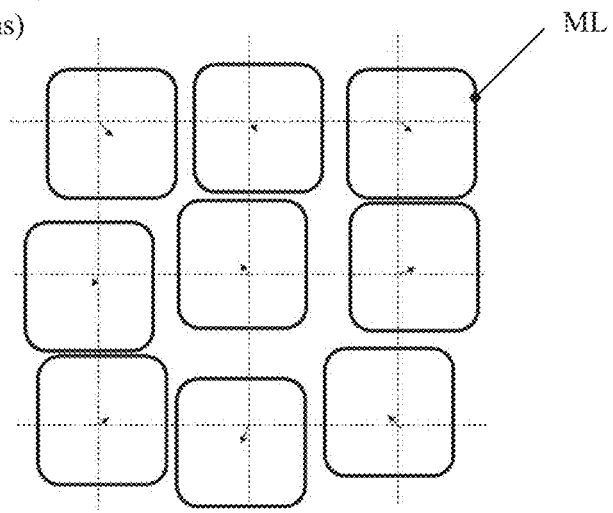

Furthermore, for the first optical element 10, a microlens array may be used, in which the center position of each microlens ML is displaced in X, Y, or Z direction based on the microlens array 10M of the above-mentioned hexagonally packing arrangement and its arrangement. The X and Y directions are directions that are orthogonal to each other within a plane of the microlens having a substantially flat shape, and the Z direction is a direction perpendicular to the plane of the microlens array. In addition, the Z direction is a direction along the symmetry axis of the microlens ML, and the X and Y directions are directions perpendicular to the symmetry axis and orthogonal to each other. FIG. 11B shows an example of such a microlens array in a plan view. In the example of FIG. 11B, as schematically shown in FIG. 11C, the arrangement of each microlens ML is randomly varied within the range of ±4 μm in each of the X and Y directions and within the range of ±1 μm in the Z direction (lenses are moved in arrow directions). In other words, it can be said that in the microlens array of FIG. 11B, the microlenses in the hexagonally packing arrangement include appropriate irregularities in the arrangement. FIG. 11D schematically shows an example of the arrangement of the microlenses with similar irregularities when the microlens ML has a rectangular shape.

Figure 12:
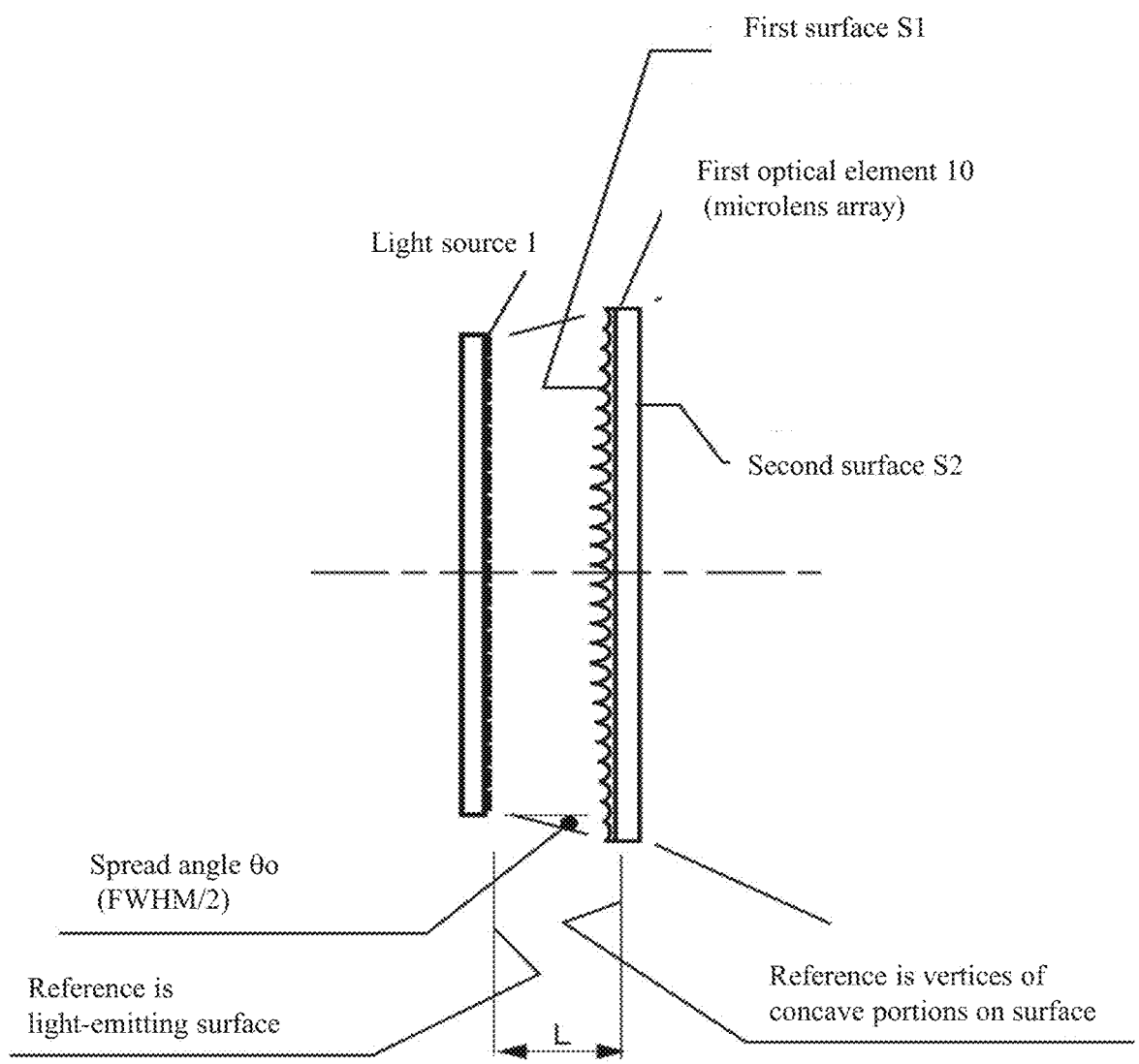
FIG. 12 is a view explaining a distance L between a light source 1 and a first optical element 10.

Next, a distance L between the light source 1 and the first optical element 10 will be described referring to FIG. 12. As the distance L between the light source 1 and the first optical element 10 increases, the cross-sectional area of the bundle of rays that should be incident on the first surface S1 of the first optical element 10 increases, which tends to result in an increase in the dimension of the entire illumination device. In contrast, when the distance L is excessively small, the number of individual structures, such as microlenses and microprisms through which light transmits, decreases, and the light output from the first optical element 10 is likely to be uneven.

The first optical element 10 preferably includes at least 10 microlenses ML within the range of the cross section of the bundle of rays received from the light source 1. It is preferable that the following expressions be satisfied:

$$10 < \pi \times (L \times \tan \theta o)^2 / \pi D_A^2$$

$$\sqrt{10} < L \times \tan \theta o / D_A$$

more preferably, $$10 < L \times \tan \theta o / D_A$$

where L is a distance from the light source 1 to the first optical element 10, θo (where θo=FWHM/2) is a spread angle of light output from the light source 1, and $D_A$ is an average of the radii of the microlenses.

When the second optical element 20 is a lens, a fisheye lens is preferably used as the second optical element in order to have a function of outputting light at a wider angle for illumination in a wide range. The fisheye lens is an equidistant projection type of lens. In typical fisheye lenses, the incident angle θ of light has a proportional relation with a height h of an image at an imaging position. In the present embodiment, it is preferable that the second optical element 20 made up of such a fisheye lens receive light and expand the angle of irradiation of the output light.

The fisheye lens used as the second optical element 20 has an angle of view W (full angle) of 150° or larger, preferably 160° or larger, more preferably 180° or larger, particular preferably 200° or larger.

The lens of the second optical element 20 may be adjusted to be positioned with respect to the light source 1 such that its optical axis is substantially parallel to or overlaps with the optical axis of the light source 1. Adjusting the optical axis of the second optical element 20 to substantially coincide with the optical axis of the light source 1 may allow obtaining uniform illumination light with high symmetry.

Examples of the fisheye lens that may be used in the present embodiment may include a fisheye lens used in an interchangeable lens camera, a fisheye lens used in a camera module embedded in a smartphone, a mobile terminal, or the like (including a conversion lens attached to the front of an existing camera).

The first optical element 10 converts the light from the light source 1 into light having a predetermined irradiation angle and a uniform irradiation intensity within a plane. The light is then refracted through the lens (for example, fisheye lens) forming the second optical element, so as to provide an illumination device having a wide irradiation angle and a uniform irradiation intensity in each direction. The illumination device of the present embodiment is useful in 3D sensing technology such as a facial recognition system, an onboard camera, LiDAR application, which have recently been developed. The Time of flight (TOF) technique is a typical method of the 3D sensing technology, designed to obtain three-dimensional information by measuring a time the illumination light takes to travel to a target object and return from the target object. At this time, the illumination light emitted at a wider angle allows obtaining more information, and thus it is important that the illumination device emits light from the light source at a wide angle. According to the illumination device of the present embodiment, the light intensity may be constant regardless of its illumination angle (divergence angle), thus allowing easy analysis using the TOF technique.

EXAMPLES

Next, examples of the present invention will be described below.

Example 1

An illumination device according to Example 1 is prepared based on the following components. For the light source 1, NIR-VCSEL (Part Number: V0081) available from Vixar Inc. is used. This light source emits near infrared light at a main wavelength of 940 nm. In addition, this light source is a multi-mode array of a hexagonally packing arrangement, and is an aggregate of totally 281 VCSEL light emitting portions. The FWHM is typically 18° and the size of the light emitting portion is 0.9 mm×1 mm.

Figures 13A, 13B:
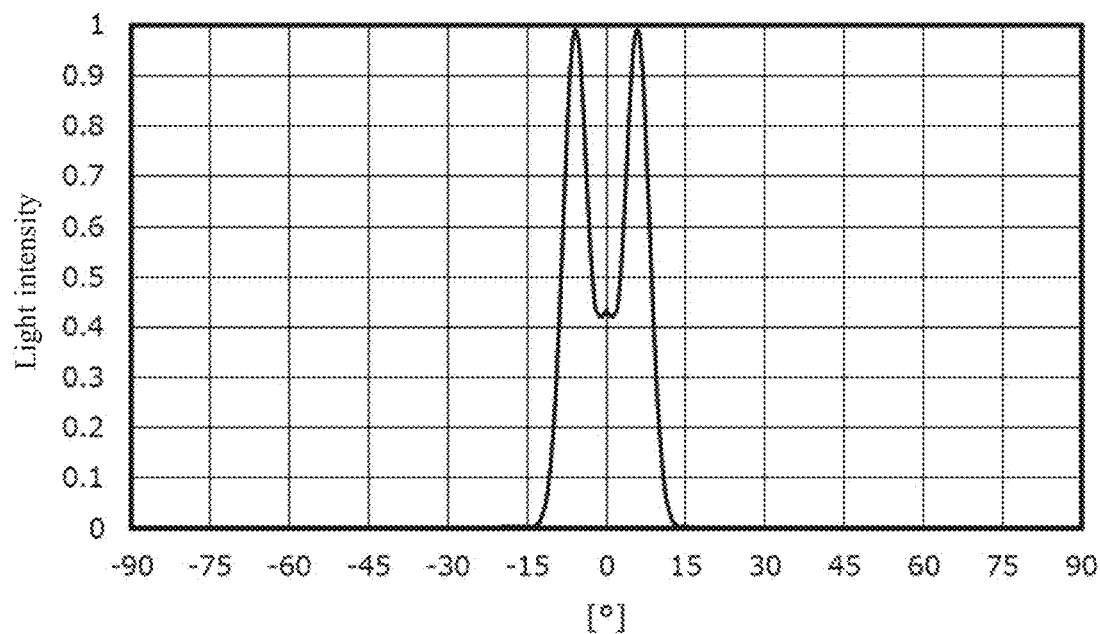
FIG. 13A shows a light intensity distribution of light output from NIR-VCSEL employed as the light source 1 in Example 1.
FIG. 13B shows various numerals employed in Example 1.

FIG. 13A shows a light intensity distribution of light output from NIR-VCSEL employed as the light source 1. The light intensity distribution of the light output from the light source exhibits a substantially donut-shaped light intensity distribution, in which the central portion has a small light intensity.

For the first optical element 10, a microlens array having an outer dimension of 1 mm×1 mm and a thickness of 0.4 mm and including the microlenses ML arranged in a hexagonal packing at a basic pitch of 24 µm is used. The microlens ML has an outer shape of hexagon, a size D of φ23 µm at maximum, and the shape given by Equation 1 including the coefficients shown in FIG. 13B.

Figure 14:
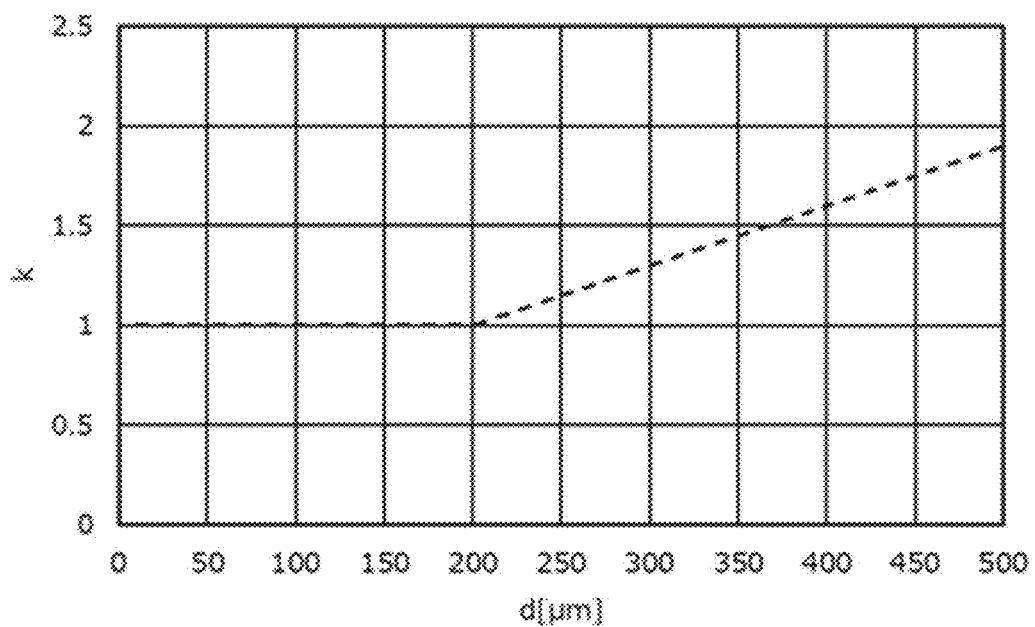
FIG. 14 is a graph showing the relationship between a distance d and a specific inclination angle adjustment coefficient k in Example 1.

In addition, consider an incircle of the contour of the first optical element 10 as a virtual circle. The center C of the virtual circle corresponds to the geometrical center of the microlens array 10M and also coincides with the microlens ML having the symmetry axis at the same time. The virtual circle has a radius $R_H$ of 500 µm. The relationship between the distance d from the center C of the virtual circle and k according to Equation 1 is shown in FIG. 14. It should be noted that the actual value of d is discrete according to the arrangement of the symmetry axis of the microlens formed at each pitch.

In the range of d=0 µm to 200 µm ($d_1$=200 µm), k=1; if d=$R_H$=500 k=1.91; in the range in which k varies according to d (d=200 µm to 500 µm), k has an average change rate of $3\times10^{-3}$[/µm]. It should be noted that the microlenses ML include irregularities of ±4 µm in the X and Y directions and ±1 µm in the Z direction (sag direction) with respect to the basic pitch of 24 µm.

The microlens array 10M is formed on a glass substrate by resin casting using a mold prepared in advance in which concave and convex shapes of the lenses of the microlens array 10M are reversed. For the glass substrate, a borosilicate glass substrate (D263 T eco available from Corning Incorporated) having a thickness of 0.4 mm is used. For the resin, a photo-curable resin (Celloxide 2021P available from Daicel Corporation, main substances 3',4'-epoxycyclohexylmethyl-3,4-epoxycyclohexanecarboxylate) is used.

Figure 15:
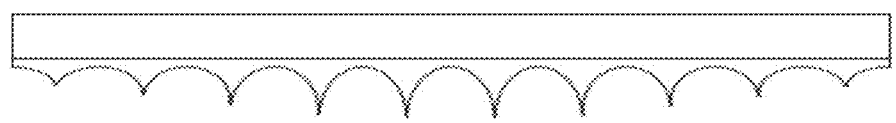
FIG. 15 is a schematic diagram of the microlens array of Example 1.

FIG. 15 is a schematic diagram of the cross section of the microlens array prepared in the above manner. It should be noted that FIG. 15 is a schematic diagram for facilitating an understanding of the aspect in which the sag is distributed, and is different from the actual shape, including the number of microlenses ML, the size of the microlens ML, the scale ratio of the microlens ML to the outer shape of the microlens array, the scale ratio of the thickness to the sag of the microlens ML, and the like.

Figure 16:
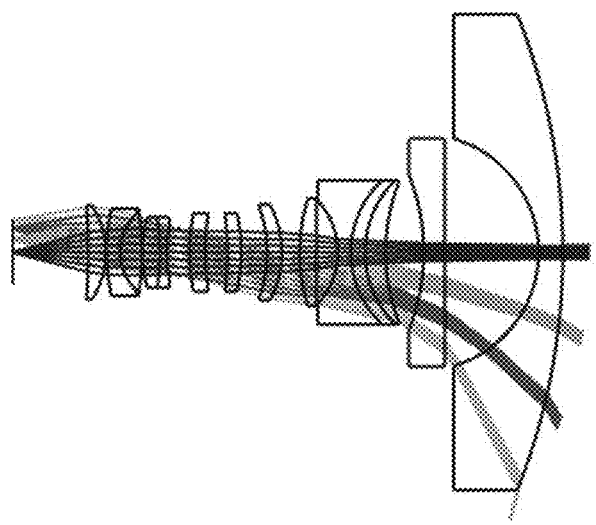
FIG. 16 shows an example of a fisheye lens that is employed as a second optical element 20 in Example 1.

For the second optical element 20, a fisheye lens as shown in FIG. 16 is used. The fisheye lens has an angle of view of 210°.

Figure 17:
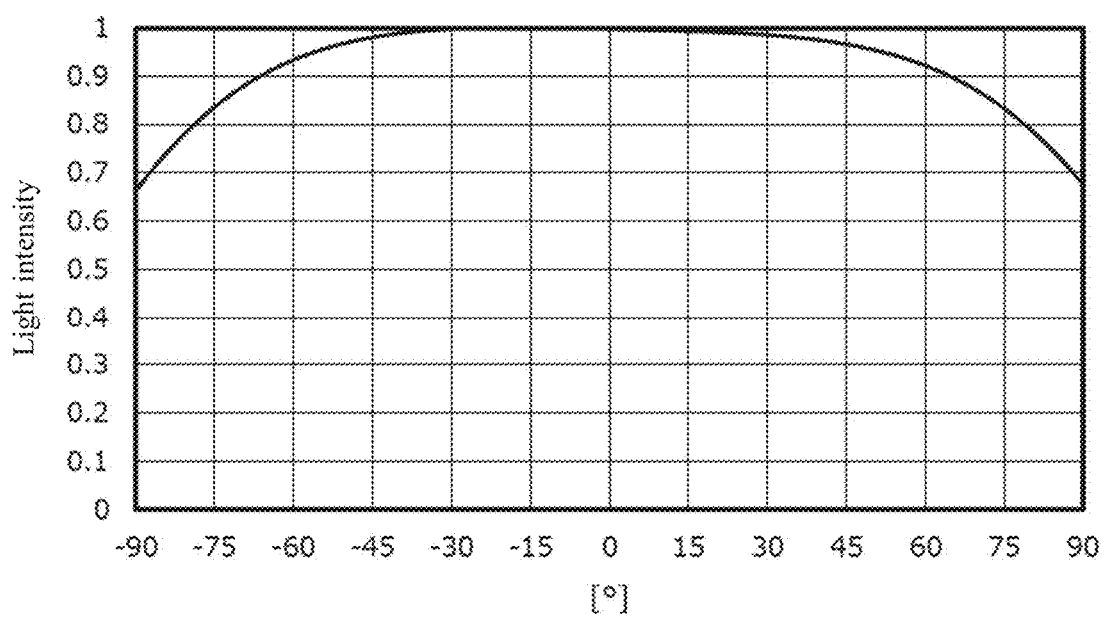
FIG. 17 is a simulation result of Example 1.

The illumination device (Example 1) shown in FIG. 1 is prepared using the light source 1, the first optical element 10, and the second optical element 20 as described above, and a light intensity distribution of illumination light of the illumination device is determined by a simulation. The result is shown in FIG. 17. In the simulation, OpticsStudio Ver20.1 available from ZEMAX LLC. is used, and a light intensity distribution is determined by tracing $1\times10^7$ rays virtually output from the light source having an emission surface of 0.9 mm×1 mm with weighting according to the light intensity distribution of the light source 1. In the characteristics of the light intensity distribution of the illumination device according to Example 1, the light intensity is 0.68 when the output angle is 90° or −90°, and the output angle for a light intensity of 0.9 is ±65° to 66°. According to Example 1, an illumination device which emits illumination light based on the laser light from the light source 1 and having a sufficiently wide irradiation angle and a uniform light intensity within a predetermined range can be provided.

Comparative Example 1

Next, a comparative example of Example 1 will be described. In the comparative example, except $d_1$=$R_H$=500 µm, the conditions of the microlens array serving as the first optical element 10 are identical to those of the first optical element 10 used in Example 1. That is, in the microlens array 10M serving as the first optical element 10 according to Comparative Example 1, the shapes of the microlenses ML are even (k=1) across the microlens array 10M, and the divergence angle θd and the specific inclination angle β of the microlens ML are constant across the microlens array 10M.

In the illumination device according to Comparative Example 1, except the microlens array 10M of the first optical element 10, the light source 1 and the second optical element 20 are identical to those of the illumination device according to Example 1, and the conditions including intervals and coaxiality of such constituent elements are identical to those of Example 1.

Figure 18:
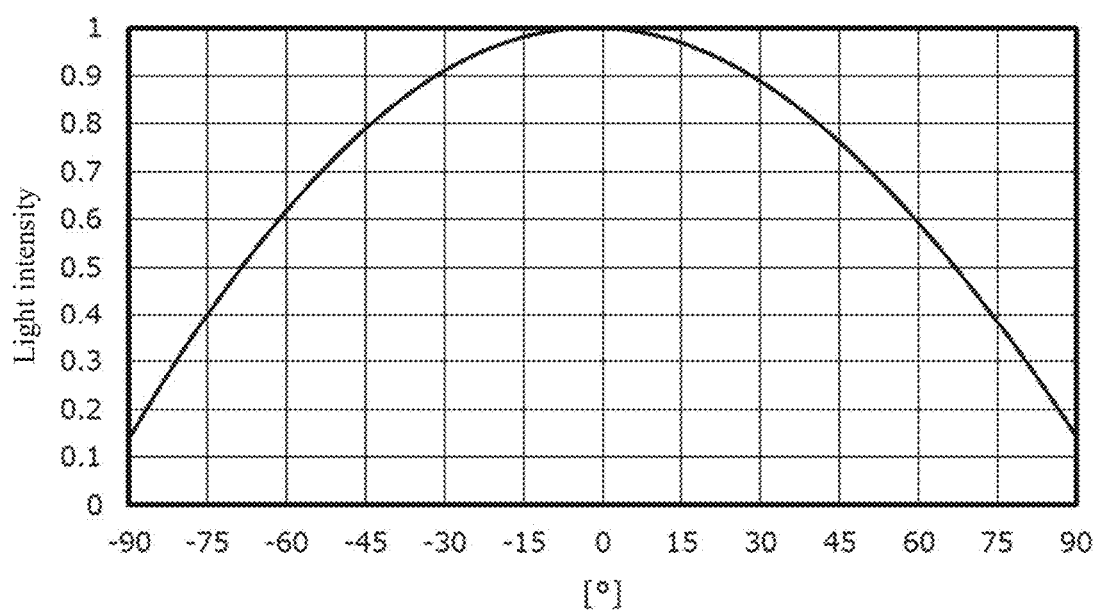
FIG. 18 is a simulation result of Comparative Example 1.

The illumination device according to Comparative Example 1 is prepared using the light source 1, the first optical element 10, and the second optical element 20 as described above, and a light intensity distribution of illumination light of the illumination device is determined by a simulation. The result is shown in FIG. 18. In the simulation, OpticsStudio Ver20.1 available from ZEMAX LLC. is used as in Example 1, and a light intensity distribution is determined by tracing $1\times10^7$ rays virtually output from the light source 1 having an emission surface of 0.9 mm×1 mm with weighting according to the light intensity distribution of the light source 1. The light intensity is 0.15 when the output angle is 90° or −90°, and the output angle for a light intensity of 0.9 is ±32° to 33°.

As can be seen from FIG. 18, if the divergence angle of the microlenses ML included in the microlens array 10M serving as the first optical element 10 is uniform within the range of the virtual circle, an even light intensity distribution cannot be obtained. This is because using the fisheye lens for the second optical element 20 allows illumination in a wide-angle range, but increases reflection of light incident to the lens or element on the interface due to the large incident angle, thus resulting in a low transmittance of the light emitted at a wide angle through the fisheye lens.

Meanwhile, in an illumination device not including the first optical element 10 and including the light source 1 using VCSEL and the fisheye lens as the second optical element 20, the intensity of light emitted at a predetermined angle is proportional to the light intensity of rays output from a predetermined position of the light source 1. That is, while ensuring that the symmetry axis of the light source 1, such as a VCSEL array that has a constant light emitting area and outputs light with a substantially axisymmetric light intensity distribution, is coaxial with the optical axis of the fisheye lens that is the second optical element 20, the rays close to the symmetry axis (the optical axis of the device) of the light source 1 are output from the illumination device at a small output angle, and the rays relatively far from the symmetry axis of the light source 1 are output from the illumination device at a relatively large output angle. In view of this, in order for the light output from the illumination device to have an even light intensity distribution (illumination intensity distribution) (i.e., to obtain illumination light with uniform luminance), it is necessary to suppress the light intensity derived from the rays output from the portion close to the symmetry axis of the light source 1 and to increase or maintain the light intensity derived from the rays output from the portion far from the symmetry axis while suppressing a decrease in the light intensity.

The first optical element 10 used in the illumination device according to the present invention has a diffusion function, and increases the divergence angle θd by the structure close to the center (central portion) of the first optical element 10 and decreases the divergence angle θd by the structure in the portion far from the center (peripheral portion), so that the illumination device can provide illumination with uniform luminance. In addition, since the illumination device according to the present embodiment can use a light source that outputs light having a large light intensity such as a laser, the illumination device can avoid a situation in which the entire illumination becomes dark due to its large illumination range.

Others

The present invention is not limited to the aforementioned embodiments, and includes a variety of variations. For example, although the aforementioned embodiments have been described in detail to clearly illustrate the present invention, the present invention need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add, remove, or substitute a structure of another embodiment.

REFERENCE SIGNS LIST

1 Light source
10 First optical element
20 Second optical element

The invention claimed is:
1. An illumination device, comprising:
a light source including at least one light emitting portion;
a first optical element configured to receive light output from the light source and output the light while expanding an output angle thereof; and
a second optical element configured to receive light output from the first optical element and output the light while further expanding an irradiation angle thereof;
wherein the first optical element is a microlenses array;
wherein the microlenses array includes a first region including a center C of the first optical element and a second region around the first region; and
wherein the first region includes a plurality of microlenses having a substantially constant sag, and the second region includes a plurality of microlenses whose sag decreases as the distance from the center of the first optical element increases.

2. The illumination device according to claim 1, wherein when an inclination angle of a tangent plane on a lens surface at a predetermined position between a center and an edge of each microlens is represented by a specific inclination angle β, the specific inclination angle β is constant among the plurality of microlenses in the first region, and the specific inclination angle β varies according to the distance in the second region.

3. The illumination device of claim 2, wherein $10<\pi\times(L\times\tan\theta o)^2/\pi D_A^2$ is satisfied, where L is a distance from the light source to the first optical element, θo (where θo=FWHM/2) is a spread angle of light output from the light source, and DA is an average of the radii of the microlenses.

4. The illumination device according to claim 1, wherein the second optical element is a fisheye lens.

5. The illumination device of claim 4, wherein $10<\pi\times(L\times\tan\theta o)^2/\pi D_A^2$ is satisfied, where L is a distance from the light source to the first optical element, θo (where θo=FWHM/2) is a spread angle of light output from the light source, and DA is an average of the radii of the microlenses.

6. The illumination device according to claim 1, wherein $10<\pi\times(L\times\tan\theta o)^2/\pi D_A^2$ satisfied, where L is a distance from the light source to the first optical element, θo (where θo=FWHM/2) is a spread angle of light output from the light source, and DA is an average of the radii of the microlenses.

7. The illumination device of claim 1, wherein the light source outputs light with a substantially donut-shaped light intensity distribution.

8. The illumination device of claim 1, wherein a direction parallel to a symmetry axis of the microlenses is a Z direction, and a plane perpendicular to the Z direction is represented by an X direction and a Y direction; and
wherein individual microlenses have irregularities of ±4 µm in the X and Y directions and ±1 µm in the Z direction from a hexagonally packing arrangement and a square arrangement.

* * * * *